United States Patent [19]

Possati

[11] Patent Number: 5,024,002
[45] Date of Patent: Jun. 18, 1991

[54] APPARATUS WITH A SUPPORTING FRAME AND PROCESS FOR MANUFACTURING SUCH A FRAME

[75] Inventor: Mario Possati, Bologna, Italy

[73] Assignee: MARPOSS Societa' per Azioni, S. Marino di Bentivoglio, Italy

[21] Appl. No.: 554,168

[22] Filed: Jul. 19, 1990

Related U.S. Application Data

[60] Division of Ser. No. 423,740, Oct. 19, 1989, abandoned, which is a continuation of Ser. No. 191,536, May 9, 1988, abandoned.

[30] Foreign Application Priority Data

Jun. 16, 1987 [IT] Italy .................................. 3521 A/87
Nov. 9, 1987 [IT] Italy .................................. 3683 A/87

[51] Int. Cl.$^5$ .............................................. G01B 5/20
[52] U.S. Cl. ........................................ 33/549; 33/550; 33/552; 248/676
[58] Field of Search ............... 248/573, 572, 554, 553, 248/676, 677, 678; 33/549, 550, 551, 552

[56] References Cited

U.S. PATENT DOCUMENTS

| | | | |
|---|---|---|---|
| 1,628,620 | 5/1927 | Steen | 248/657 X |
| 2,689,705 | 9/1954 | Ciaccio | 248/346 |
| 3,011,780 | 12/1961 | Hanisko . | |
| 3,046,669 | 7/1962 | Lasko | 33/551 |
| 3,248,077 | 4/1966 | Charles | 248/678 X |
| 3,330,043 | 7/1967 | Sonner | 33/549 |
| 3,429,048 | 2/1969 | Eberhard | 33/551 |
| 3,639,993 | 2/1972 | Sartorio | 33/572 |
| 3,652,044 | 3/1972 | Manross | 248/657 |
| 4,216,933 | 8/1980 | Cramer | 248/346 X |
| 4,233,744 | 11/1980 | Possati | 33/143 L |
| 4,354,655 | 10/1982 | Hengst | 248/676 X |
| 4,511,112 | 4/1985 | Ruehle | 248/678 X |
| 4,597,184 | 7/1986 | Golinelli et al. | 33/143 F |
| 4,604,810 | 8/1986 | Gusching et al. | 33/555 |
| 4,680,865 | 7/1987 | Danielli et al. | 33/549 |

FOREIGN PATENT DOCUMENTS

| | | | |
|---|---|---|---|
| 162471 | 3/1949 | Austria | 248/678 |
| 2458287 | 6/1976 | Fed. Rep. of Germany | 248/676 |
| 2019573 | 10/1979 | United Kingdom | 33/552 |
| 2084327 | 4/1982 | United Kingdom . | |
| 2177032 | 1/1987 | United Kingdom . | |

OTHER PUBLICATIONS

Marpass, "M53 Bench Gauge System for Shafts" 1986.

Primary Examiner—William A. Cuchlinski, Jr.
Assistant Examiner—William C. Dowling
Attorney, Agent, or Firm—Stevens, Davis, Miller & Mosher

[57] ABSTRACT

A frame for supporting operative means includes two first, parallel metal beams arranged side by side and having the ends coupled to two second, parallel metal beams arranged perpendicularly to the first beams. In order to provide a rigid frame structure easy to manufacture depending on the features of the relevant apparatus and permitting quick coupling of the operative means in desired positions, the first beams are arranged to define a through slot for the passage of coupling elements coupling the operative means to the frame and for providing a guide for positioning the operative means in desired positions with respect to the frame. The second beams are welded at relevant ends of the first beams. The invention can also be applied for manufacturing frames including two pairs of parallel bars defining two guides, in particular frames of gauges for checking linear dimensions of parts.

13 Claims, 4 Drawing Sheets

APPARATUS WITH A SUPPORTING FRAME AND PROCESS FOR MANUFACTURING SUCH A FRAME

This application is a divisional of application Ser. No. 423,740, filed Oct. 19, 1989, and now abandoned which in turn is a continuation of application Ser. No. 191,536, filed May 9, 1988, and now abandoned.

BACKGROUND OF THE INVENTION

1. Filed of the Invention

The invention relates to an apparatus with a supporting frame, operative means supported by the frame and coupling means for securing the operative means to the frame, the frame including two first, parallel metal beams arranged side by side and coupled to two second metal beams arranged transversely to the first metal beams.

The invention also relates to an apparatus with a base, a supporting frame fixed to the base and defining two longitudinal, parallel guides, operative means supported by the frame, and coupling means for securing the operative means to the frame, at desired positions with respect to the guides.

Further, the invention relates to a gauge for checking features of pieces with rotational symmetry comprising means for positioning the piece to be checked; checking means; support means for carrying the positioning means and the checking means, the support means comprising a support base that defines two longitudinal parallel guides and intermediate support means with at least two transversal members longitudinally adjustable with respect to the support base; and fastening means with at least two pairs of rapid fastening devices, for clamping the transversal members to the support base.

Moreover, the invention relates to a process for manufacturing a supporting frame or sub-frame for an apparatus including operative means and coupling means for coupling the operative means to the supporting frame, the process including the step of assembling two longitudinal and two transversal rigid profiled beams.

2. Description of the Prior Art

Mechanical apparatuses, such as machine tools and measuring machines or benches for measuring features —like linear dimensions —of workpieces, generally comprise support structures and operative means or devices carried by the support structures. Of course, the support structures may also have workholding functions. The support structures may be more or less stiff, flexible (as to manufacturing and/or use); and expensive, depending on the type of apparatus. Thus, they may range, for example, from modular flexible fixtures, welded tubular structures, integral baseplates —of hardened steel or cast iron —with tee—slots, cast iron beds, concrete or granite beds.

In particular, U.S. Pat. No. US-A-4,233,744 discloses a bench gauge including an integral plate defining three parallel guide slots for positioning gauging heads. The gauging heads can be clamped to the plate by means of connection screws passing through the slots and having screw heads accessible from the space under the plate. Of course, for precision machine tools, the stiffness of the support structures is a basic requisite and for this reason the relevant main support structures may be made of integral and massive bases and/or beds, while the secondary support structures may comprise welded tubular structures, baseplates with tee-slots, etc. GB-A-2177032 relates to a grinding machine comprising a massive understructure or base and a rigid superstructure or bed. The bed comprises a rigid frame which is assembled of several profiled beams including one or more hollow beams. Massive dedicated support structures, like cast iron beds or bases, especially designed for a specific apparatus or machine, are generally costly as far as materials and manufacturing are concerned. Moreover, their lead time, i.e. the time from order to delivery, is rather high. Flexible modular support structures may allow reduction of costs, but their stiffness may be poor, particularly when these structures are obtained by coupling most of or all the components by fasteners permitting disassembly. Thus, very high modularity and flexibility, both in the manufacturing and in the use, may be unsuitable for precision machine tools, measuring machines, and the like.

Another type of apparatus belonging to the field of the invention is already marketed by the assignee of the present invention and is described in the brochure "M53 BENCH GAUGE SYSTEM FOR SHAFTS" distributed as from November 1986 and consists in a bench gauge for checking diameters and longitudinal dimensions of shafts. It has a modular structure and is easily retoolable, to the purpose of checking, by utilizing the necessary components or modules and by adjusting their position, pieces of different shapes and/or dimensions. It comprises a longitudinal base consisting of a horizontal plate, with three feet and two vertical side plates screwed to the horizontal plate. Arranged at the top of the vertical plates are transversal support members that also have limit stop surfaces for cooperating with the vertical plates for keeping the members in a direction that is perpendicular to the longitudinal development direction of the plates. The transversal members carry comparative measuring cells, guiding and axial reference elements for facilitating the loading of the piece to be checked and determining its position along the longitudinal direction, and VEE-reference blocks for determining the position of the piece axis. These components are, at least partially, housed between the vertical plates. The measuring cells can be of the "snap" type for checking diameters, or of another type, in particular for checking longitudinal dimensions.

For clamping the transversal members to the vertical plates there are foreseen rapid fastening devices consisting of blocks clamped against a side of internal longitudinal grooves of the vertical plates, by means of bolts. The clamping is made from above the base formed by the horizontal and vertical plates. This known gauge has a massive structure that while on the one hand contributes to guarantee excellent measurement accuracy and repeatability, on the other hand gives rise to some inconveniences, in particular as far as the costs of the materials, the associated machining operations and the considerable overall dimensions are concerned.

SUMMARY OF THE INVENTION

The object of the present invention is to provide a supporting frame or structure, or a sub-frame or sub-structure, constituting a more favourable compromise between the features of the dedicated structures and those of the flexible structures.

The apparatus of the present invention comprises a supporting frame, operative means supported by the frame, and coupling means for securing the operative means to the frame, the frame including two first parallel metal beams arranged side by side and coupled to two second metal beams arranged transversely to the first beams, wherein the first beams are mutually arranged to define a through slot for the passage of the coupling means and for providing a guide for positioning the operative means in desired positions with respect to the frame, and the second beams are welded to the first beams.

Another apparatus according to the invention comprises a base, a supporting frame fixed to the base and defining two longitudinal, parallel guides, operative means supported by the frame, and coupling means for securing the operative means to the frame at desired positions with respect to the guides, wherein the supporting frame includes two pairs of longitudinal, parallel bars and two transversal bars welded to the longitudinal bars, each guide being defined by a relevant pair of longitudinal bars and by a through opening between these bars which permits the passage of the coupling means.

Moreover, according to the present invention a gauge for checking features of pieces with rotational symmetry comprises positioning means for positioning the piece to be checked; checking means; support means for carrying the positioning means and the checking means, the support means comprising a support base that defines two longitudinal parallel guides and intermediate support means with at least two transversal members longitudinally adjustable with respect to the support base; and fastening means with at least two pairs of rapid fastening devices, for clamping the transversal members to the support base, wherein the support base comprises two pairs of longitudinal parallel bars and two transversal bars for connecting the longitudinal bars, each guide being defined by the associated bars of one of the two pairs and by an opening passing through these two bars, each rapid fastening device comprising a through element passing through the opening of an associated guide, a first limit stop element associated to an end of the through element and adapted for cooperating with the two bars of the associated pair of bars and a second limit stop element coupled in a movable way to the other end of the through element for cooperating with an end of an associated transversal member, in a position opposed to the first limit stop element with respect to the bars, for locking the end of the transversal member to the support base.

The process of the present invention, for manufacturing a supporting frame or sub-frame for an apparatus including operative means and coupling means for coupling the operative means to the supporting frame, includes the step of assembling two longitudinal and two transversal rigid profiled beams, by arranging the longitudinal beams at a mutual distance suitable for defining a linear guide and for permitting cooperation of the coupling means with the two longitudinal beams, and welding each of the transversal beams to the longitudinal beams.

Complex supporting structures and frames may be obtained by coupling to one another many elemental frames made according to the present invention and, if desired, additional elements, like plates etc.

The invention solves the problem of designing and manufacturing a supporting structure that can be made of very cheap commercial components, through very simple manufacturing operations and with short lead time, and that provides a stiffness suitable for precision machine tools, accurate inspection equipments, and the like.

Among the advantages attained, there are the reduction of the costs, the obtainment of modular support structures of reduced overall dimensions and providing flexibility as to the assembling and fixing of the devices to be supported, the good accessibility of the support structures and of the supported devices. The modular support structures can be made by using readily available and cheap commercial parts (metal beams) through manufacturing steps not including substantial operations with material removal and not requiring highly skilled operators. In fact, said manufacturing steps basically comprise cutting (e.g. sawing) beams, welding beams and coupling the structure elements and the sub-structures by fasteners. The manufacturing equipment may be simple and of general purpose type. The investments for manufacturing equipment and for materials to be held in stock can be dramatically reduced.

Thus, design and manufacturing of complex support structures are simplified and are particularly adapted to be made through modern computerized techniques (e.g. CADAM —i.e. Computer Aided Design And Manufacturing-, JIT- i.e. Just-In-Time technique-, Group Technology, CIM- i.e. Computer Integrated Manufacturing-, etc.).

BRIEF DESCRIPTION OF THE DRAWINGS

The invention is now described in detail with reference to the enclosed drawings, wherein there are used different scales and.

the FIGS. 1 to 3 are a perspective, plan and side view, respectively, of a support base or structure made according to a preferred embodiment of the invention.

DESCRIPTION OF THE PREFERRED EMBODIMENTS

Figure 1:
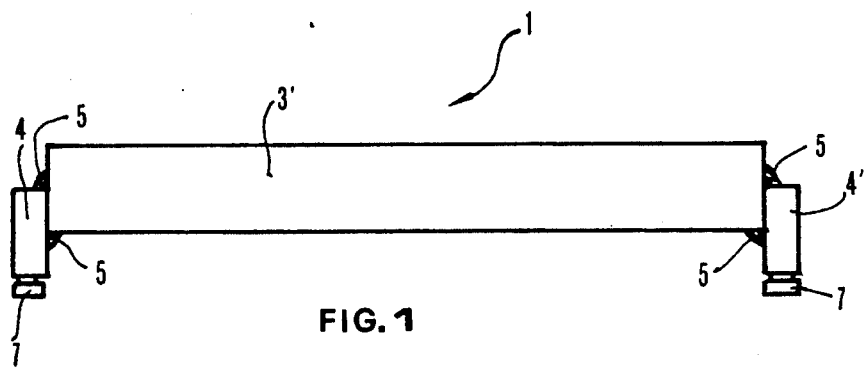
Figure 2:
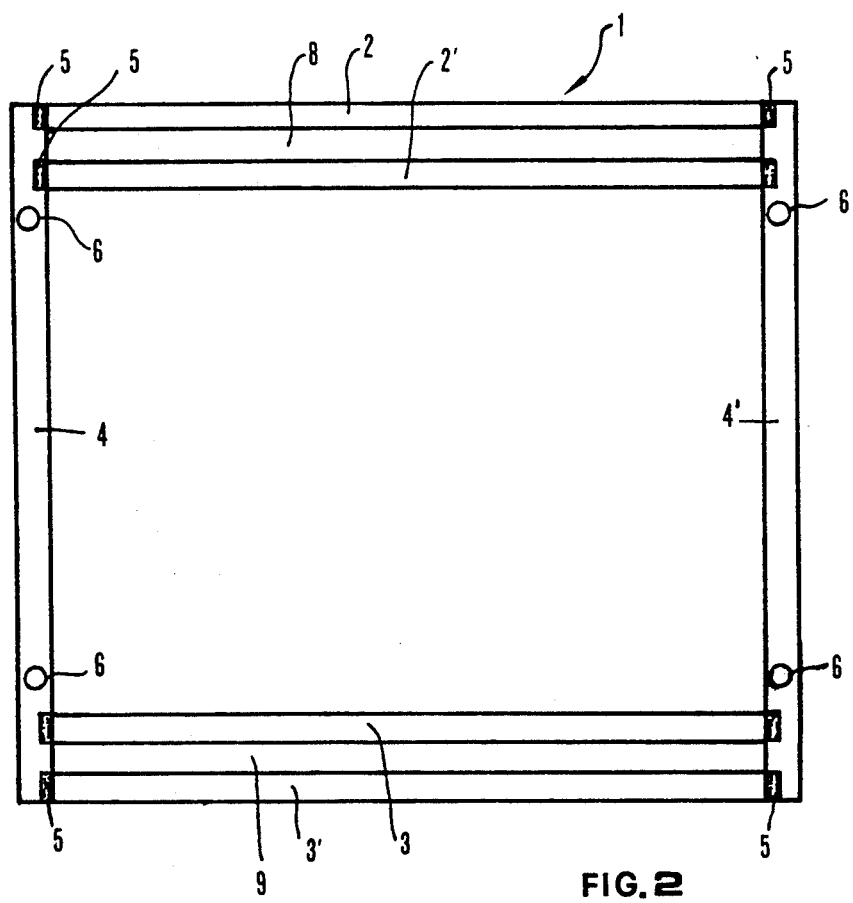
Figure 3:
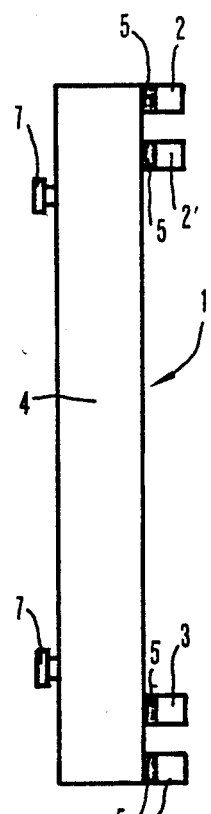

Support base 1 shown in FIGS. 1 to 3 comprises two pairs of longitudinal prismatic bars 2,2' and 3,3' and two transversal prismatic bars 4,4', arranged perpendicularly to the longitudinal bars. These bars 2,3,4,2',3',4' are formed by cutting, i.e. sawing, parts of a same cold-rolled steel section bar, with a rectangular cross-section. Then by using a simple specific tool, the transversal bars 4,4' are welded to the ends of the longitudinal bars 2,2',3,3' by means of welds indicated by the same reference number 5. Bars 2,3,4,2',3',4 are horizontally and edgewise arranged, i.e. with the longer sides of their transversal cross-sections arranged vertically. Bars 4,4' have lateral sides which contact the ends of bars 2,2',3,3' and face just half of the end cross-sections of the same bars 2,2',3,3' and moreover have four holes 6, for fixing relevant feet 7.

Between the longitudinal bars 2,2' and 3,3', respectively, of each of the two pairs of bars there is a through opening 8,9, so as to form two longitudinal parallel guides.

Figure 4:
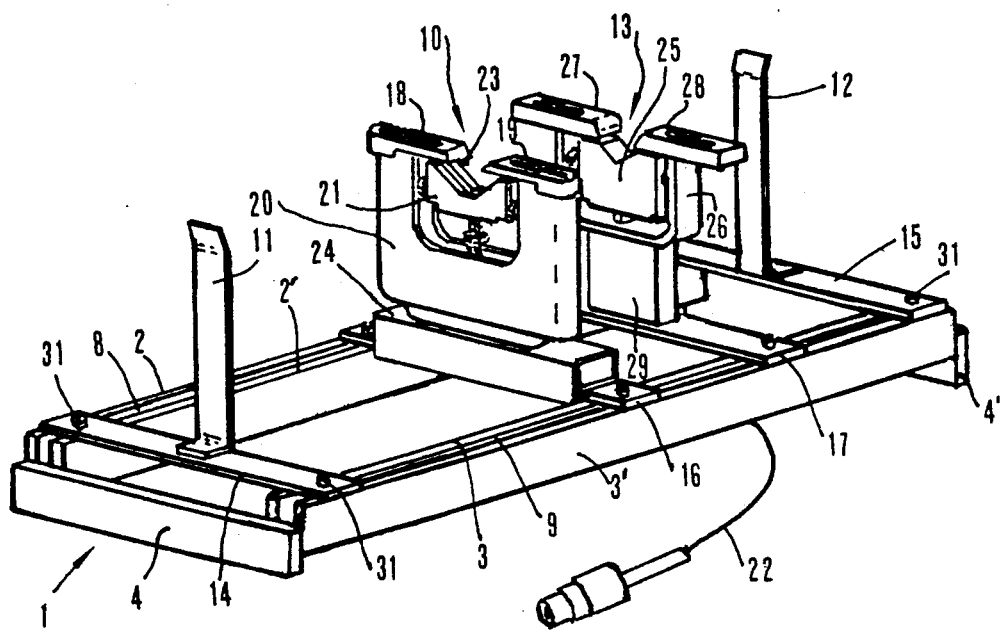
FIG. 4 is a perspective view of an electronic bench gauge, comprising a support base or frame of the type shown in the FIGS. 1 to 3 that supports, in this specific case, just one measuring cell.

FIG. 4 shows a bench gauge including a support base 1 like that of FIGS. 1 to 3. Above bars 2,3,2',3' there are arranged operative means, i.e. checking means consisting of a measuring cell 10 and positioning means comprising two guiding and axial reference elements 11,12 and a reference device 13.

The two guiding elements 11,12 are welded to intermediate support means, or transversal members 14,15, that consist of cold-rolled bars having rectangular cross-section and a length corresponding to the distance between the external bars 2,3'. Thus the ends of the transversal members 14,15 rest on the upper faces of bars 2,2',3,3' Two other transversal members 16,17 have the same length as that of the members 14,15 —so that their ends rest on the upper faces of bars 2,2',3,3' too —and support the measuring cell 10 and the reference device 13, respectively.

The measuring cell 10 consists of a snap gauge and it can be manufactured as described in Pat. No. US-A-4,597,184. Thus cell 10 comprises some elements that are not shown in FIG. 4, i.e. a support structure, two movable arms and two transducers for providing signals that depend on the position of the movable arms, and furthermore two radially adjustable guiding elements 18,19, a protection casing 20, a VEE-reference block 21, adjustable in a vertical direction (and that, more specifically, belongs to the positioning means), a cable 22 that connects the transducers to an amplifier, not shown, and two feelers coupled to the free ends of the movable arms and passing through openings of the guiding elements 18,19. Just one feeler, 23, is visible in FIG. 4. Differently from what is described in Pat. No. US-A-4,597,184, cell 10 does not have a handle and its support structure is fixed, in a way that has not been shown, to a portion 24 of transversal member 16.

The reference device 13 comprises a VEE-block, 25, vertically adjustable, and a U-shaped support element, 26, to which there are fixed in a radially adjustable way two guiding elements 27,28. The support element 26 is in turn secured to the transversal member 17 by means of a block 29.

The reference device 13 is not further described as it is similar to the one belonging to cell 10 and comprising block 21, with the main difference that the guiding elements 27,28 and block 25 do not have openings for the passage of feelers.

Figure 5A:
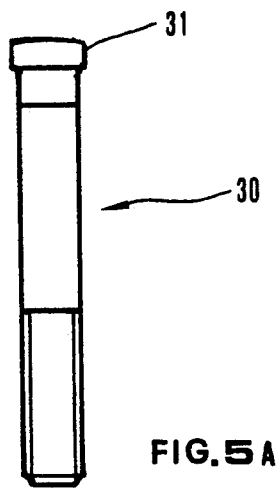
FIGS. 5A and 5B respectively show in a side view and in a plan view, the screw and the nut of a bolt of a rapid clamping device of the gauge of FIG. 4.
Figure 5B:
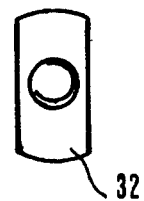

Each of the transversal members 14,15,16,17 is secured to the horizontal support base consisting of bars 2,3,2',3' by means of a pair of rapid fastening devices, one of which is shown in FIGS. 5A and 5B. The fastening device consists of a bolt comprising a screw 30 with hollow hexagonal head 31 and a nut 32 with a lobed shape. Nut 32 and head 31 form a first and a second limit stop. Nut 32 has a lobed shape, i.e. its overall dimensions according to two directions that are perpendicular to each other, in a cross-section that is perpendicular to the axis of the same nut, are different. By suitably rotating the bolt it is possible to insert nut 32 and consequently the stem or through element of screw 30 through one of openings 8 or 9, until nut 32 is under bars 2,2' or 3,3'. Thereafter, the bolt is rotated by 90° and, by keeping nut 32 stationary, screw 30 is screwed until nut 32 is clamped to bars 2,2' or 3,3' and head 31 is urged against the upper face of transversal member 14,15,16 or 17.

It is obvious that it is possible to make each of the transversal members 14,15,16 or 17 slide along the guides defined by bars 2,2',3,3' and openings 8,9 after having unlocked the associated fastening devices, but without the need of uncoupling nuts 32 from screws 30.

The perpendicularity of transversal members 14,15,16 or 17 with respect to the longitudinal direction can be guaranteed at different levels of accuracy, according to the requirements. To this purpose, there can be foreseen a limited clearance between the stems of screws 30, the openings 8,9 and the through holes of the transversal members 14,15,16,17, or use appropriate tools when retooling the bench.

Figure 6:
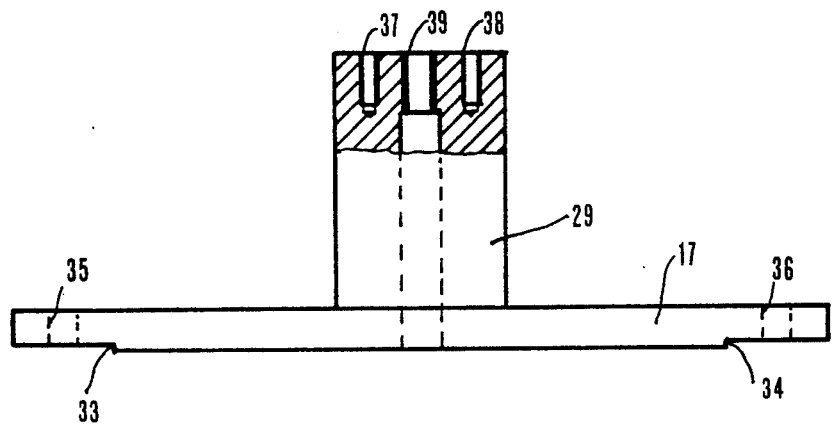
FIG. 6 is a partly cross-sectional view of a transversal support member of the gauge of FIG. 4.

Moreover, the transversal members 14,15,16,17 can define limit stop surfaces for cooperating with the internal longitudinal bars 2',3. FIG. 6 just shows limit stop surfaces 33,34 formed in the bottom part of a transversal member 17. FIG. 6 also shows holes 35,36 for the passage of associated screws 30 and a block 29 welded to member 17 and having holes 37,38 for locking a reference device 13 and another hole 39 for housing an element for the adjustment of the VEE-block 25.

Figure 7:
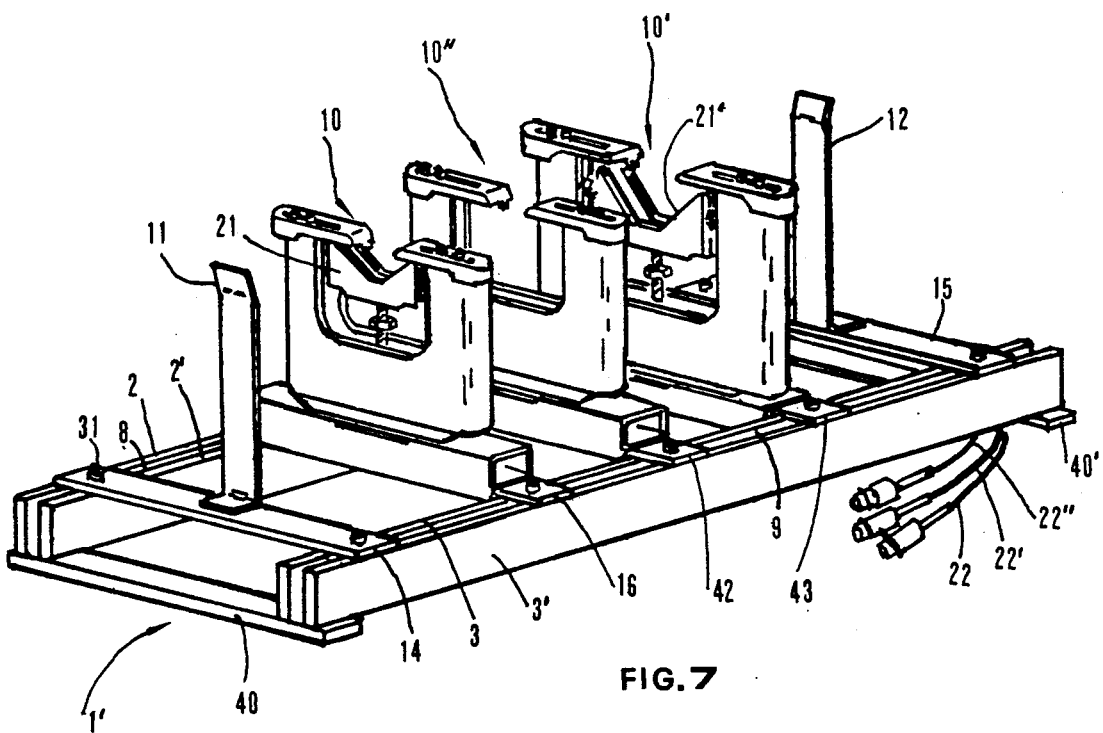
FIG. 7 is a perspective view of an electronic bench gauge comprising three measuring cells and a support base modified with respect to those shown in FIGS. 1 to 4.

The electronic bench gauge shown in FIG. 7 has a base 1' that differs from the base 1 shown in FIGS. 1 to 4 as it has transversal bars 40,40' welded under the longitudinal bars 2,2',3,3' and with the longer sides of their transversal cross-sections horizontally arranged. Furthermore there are not foreseen feet and the modules for measurement, guiding and positioning or reference comprise two guiding and axial reference elements 11,12, with associated transversal members 14,15, and three measuring cells 10,10',10" clamped to transversal member 16,42,43.

The measuring cells 10,10' have different dimensions, as they must check sections of a shaft that have considerably different nominal diameters and both comprise a VEE-shaped reference block, 21,21', adjustable in a vertical direction. The third cell 10", placed between the other two, on the contrary does not have a piece reference block. Cables 22,22',22" connect cells 10,10', 10" to an amplifier, not shown.

Now, there is described the operation of the gauges shown in FIG. 4 or 7, or other similar ones.

According to the shape and dimensions of the piece to be checked, generally of a "shaft" type, and the dimensions to be checked, in particular diameters, there are selected a base 1 or 1' of suitable dimensions, the necessary measuring cells 10,10' etc. and two reference blocks integrated in the measuring cells 10 or in reference devices 13. Moreover, in case there is the need of providing axial references to the pieces, or guiding their loading, there can be provided two guiding and axial reference elements 11,12. The previously mentioned modules are assembled onto the base in the required positions and the necessary adjustments of the feelers and of the other adjustable elements are performed. In particular, the reference blocks are adjusted in a vertical direction so as to support the piece with its longitudinal axis at a suitable height, so that —after the correct loading of the piece —the feelers of the measuring cells contact diametrically opposite points of associated sections.

Then the pieces to be checked are loaded and their dimensions are displayed and if necessary processed by the electronic amplifier of the gauge.

The invention applies in particular to electronic bench gauges for checking up to four or five diameters of shafts that have a theoretically uniform or variable cross-section. In the case of FIG. 4 there is checked just one shaft diameter.

Base 1 or 1' can also be used for benches that differ from those shown in FIGS. 4 and 7. More specifically, base 1 or 1' can be used in benches for checking also or only other characteristics, like, for example, the presence of cracks or the hardness of pieces. To this purpose there are foreseen, for example, checking cells of the eddy current type.

It is also possible to use base 1 or 1', or similar ones, in benches that comprise opto-electronic cells, for checking dimensions or the surface texture, or in apparatuses comprising operative means of basically different types.

Other possible variants can consist in foreseeing in the support means other supports or bases —of similar or different types with respect to bases 1,1'—for carrying some of the operative means or modular components e.g. checking cells, and/or guiding elements, and/or piece reference devices. In this case, the task of supporting the checking cells, the reference devices and the possible guiding elements is so distributed among a base 1 or 1' (by means of transversal members, etc.) and further supports or bases.

Even the resting of the bench on a table or external support can be obtained in a different way, for example, by means of one of said other supports.

Figure 8:
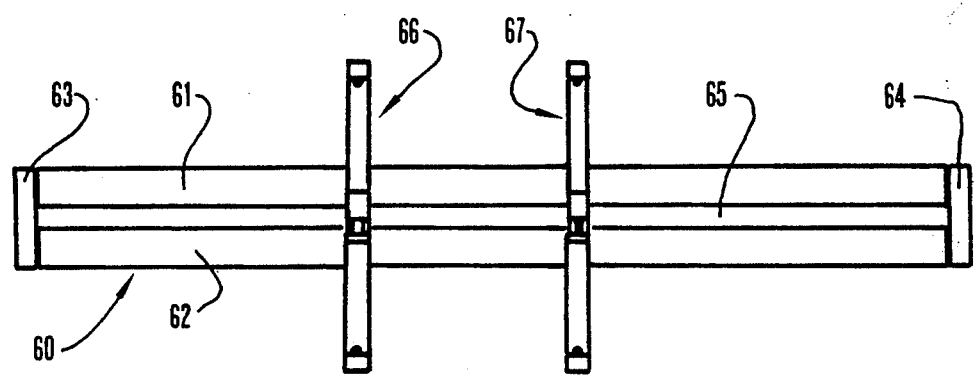
FIGS. 8 and 9 relate to another embodiment of the present invention and are a plan view and a cross-sectional view showing a support frame defining a linear guide and carrying gauging heads.
Figure 9:
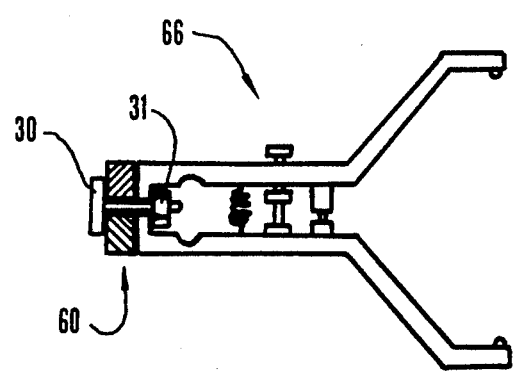

FIGS. 8 and 9 show a support structure or frame 60 obtained by coupling two longitudinal bars 61,62 by two transversal bars 63,64 arranged perpendicularly to and welded at the ends of bars 61,62. The through opening 65 between bars 61,62 defines a linear guide along which operative means, e.g. gauging heads 66,67, can be positioned. Heads 66,67 are coupled to bars 61,62 by means of fasteners including screws 30 and nuts 31. Frame 60 can be coupled by further coupling means, e.g. fasteners 30-32, to other elements and structures, in particular to bases 1 or 1', of a bench gauge or gauging machine in a way not shown.

As already mentioned, bars 2,3,4 and 2',3',4' (as well as bars 40,40',61,62 and 63,64) are preferably obtained by cutting cold-rolled steel sections. Cold-rolled steel sections have the advantage of featuring surface finish and shape accuracy sufficient for the purposes of the present invention and high hardness and stiffness, due to the hardening caused by the cold-rolling operation. The subsequent welding operations can be performed, e.g. by suitable arc-welding, without causing heating and deformations of substantial parts of the structure and therefore the hardness, stiffness and shape accuracy of the structures are not adversely affected.

What is claimed is:

1. A gauge for checking linear dimensions of pieces with rotational symmetry, comprising positioning means for positioning the piece to be checked; gauging heads for checking linear dimensions of the piece support means for carrying out the positioning means and the gauging heads, the support means comprising a support base that defines two longitudinal parallel guides and intermediate support means with at least two transversal members longitudinally adjustable with respect to the support base; and fastening means with at least two pairs of rapid fastening devices, for clamping the transversal members to the support base, wherein said support base comprises two pairs of longitudinal parallel bars and two transversal bars welded to the longitudinal bars for locally connecting them to one another, the longitudinal bars and the transversal bars having substantially rectangular cross-sections, each guide being defined by the associated bars of one of the two pairs and by the through space between these two bars, each rapid fastening device comprising a through element passing through the through space of an associated guide, a first limit stop element associated to an end of the through element and adapted for cooperating with the two bars of the associated pair of bars and a second limit stop element coupled in a movable way to the other end of the through element for cooperating with an end of an associated transversal member, in a position opposed to the first limit stop element with respect to the bars, for locking the end of the transversal member to the support base.

2. The gauge according to claim 1, wherein said longitudinal and transversal bars consist of cold-rolled steel bars.

3. The gauge according to claim 1, wherein said support base comprises feet fixed to at least two of said bars.

4. The gauge according to claim 3, wherein each transversal bar has a pair of holes for fixing associated feet.

5. The gauge according to claim 1, wherein the first limit stop element of each rapid fastening device has a lobed shape, for enabling the insertion through said through space and the cooperation with said bars.

6. The gauge according to claim 1, wherein the gauging heads are fixed to at least one of said transversal members.

7. The gauge according to claim 1, wherein said gauging heads comprise at least one measuring cell for measuring linear dimensions, with two feelers adapted for touching diametrically opposite points of the piece to be checked and said positioning means comprise two VEE-shaped support blocks.

8. The gauge according to claim 6, wherein said positioning means comprise two guiding elements and the intermediate support means comprise two further transversal members for fixing the two guiding elements to the support base by means of two further pairs of rapid fastening devices.

9. The gauge according to claim 7, wherein at least one of said VEE-shaped support blocks is part of said measuring cell.

10. The gauge according to claim 7, wherein said VEE-shaped support blocks are adjustable in a direction perpendicular to said longitudinal and transversal bars.

11. The gauge according to claim 7, wherein said measuring cell is of the snap type.

12. The gauge according to claim 1, wherein said transversal members define limit stop surfaces for cooperating with the longitudinal internal bars for keeping the transversal members in a substantially perpendicular position with respect to the longitudinal bars.

13. The gauge according to claim 1, wherein said longitudinal and transversal bars are arranged in a horizontal position, the gauging heads and the positioning means being arranged substantially above the longitudinal bars.

* * * * *

UNITED STATES PATENT AND TRADEMARK OFFICE
CERTIFICATE OF CORRECTION

PATENT NO. : 5,024,002
DATED : June 18, 1991
INVENTOR(S) : Mario POSSATI

It is certified that error appears in the above-identified patent and that said Letters Patent is hereby corrected as shown below:

Column 7, line 57, "out" should be deleted.

Signed and Sealed this

Tenth Day of August, 1993

Attest:

MICHAEL K. KIRK

Attesting Officer

Acting Commissioner of Patents and Trademarks